INVENTOR
HENRY GILBERT INGERSOLL
BY Lynn Barratt Morris
ATTORNEY

INVENTOR
HENRY GILBERT INGERSOLL

BY Lynn Barratt Morris

ATTORNEY

INVENTOR
HENRY GILBERT INGERSOLL

BY Lynn Barratt Morris
ATTORNEY

INVENTOR
HENRY GILBERT INGERSOLL

BY Lynn Barratt Morris
ATTORNEY

United States Patent Office 3,286,025

Patented Nov. 15, 1966

3,286,025

RECORDING PROCESS USING AN ELECTRON BEAM TO POLYMERIZE A RECORD

Henry Gilbert Ingersoll, Hockessin, Del., assignor to E. I. du Pont de Nemours and Company, Wilmington, Del., a corporation of Delaware Filed Oct. 25, 1962, Ser. No. 232,991
16 Claims. (Cl. 178—6.6)

Figures 1, 3:
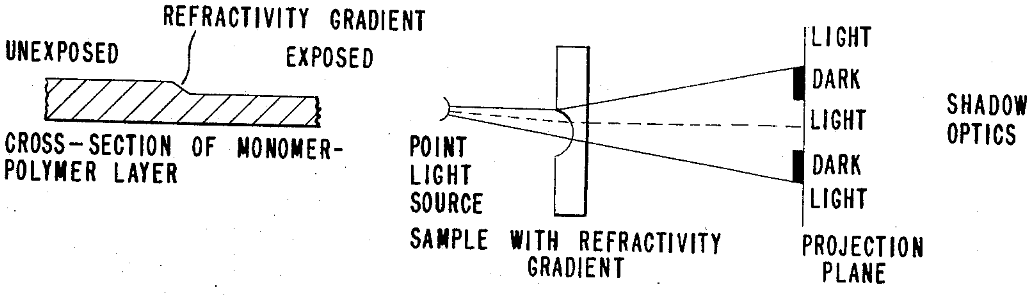

This invention relates to a process for the storage and retrieval of information. More particularly, it relates to a process for the storage of information in polymerizable layers and the retrieval of information therefrom.

Systems for the storage and retrieval of information are of considerable importance in the present day economy. This is particularly true because of the exponential rise in both amount and complexity of data which must be recorded and be retrievable in order to handle the increasing amount of every day business information and to assist in scientific developments. Many such systems are known and are enjoying widespread commercial use. Some of the known systems require separate processing steps between read-in and read-out, which is undesirable because of the time required for the separate processing steps. Some of the known systems, while adequate and providing reasonable resolution and good packing density, require intermediate wet-processing or "development" steps. This is also undesirable not only from the time required but because of the necessity of preparing and supplying fresh solutions, and for cleaning of the machines used in the systems.

An object of the present invention is to provide a new and useful process for the storage and retrieval of information. Another object is to provide such a process which is simple and dependable and does not require wet processing steps. Yet another object is to provide such a process which can be carried out at high read-in speeds and high read-out speeds. A further object is to provide such a process which has high resolution and contrast on information read-out. Still other objects will be apparent from the following description of the invention.

The process of this invention comprises:

(1) Recording information by imagewise exposing to an electron beam a polymerizable, image-recording layer comprising at least one non-gaseous ethylenically unsaturated compound, having a boiling point above 100° C. at normal pressure and being capable of forming a polymer of high molecular weight by addition polymerization, to form such a crosslinked addition polymer of high molecular weight in exposed, i.e., image, areas of said member, and (2) Retrieving said information physically, e.g., optically, mechanically, or electronically, from the polymerized image areas and remaining unexposed background areas of said exposed member by using either the difference or the gradient in physical and/or chemical properties between the exposed (polymerized) and unexposed (nonpolymerized) areas.

The polymerizable layer preferably is solid and may contain, in addition to the ethylenically unsaturated compound, at least one compatible organic polymeric binding agent. It need not contain an addition polymerization initiator although such an initiator can be present. The electron beam will cause rapid addition polymerization whether or not an initiator, e.g., free radical generating addition polymerization initiator, is present. The polymerizable layer, in general, will contain from about 10 to 60 parts by weight of the ethylenically unsaturated compound(s) and 40 to 90 parts by weight of the polymeric binding agent(s). When an addition polymerization initiator is used, such compound(s) can be present in amounts from about 0.001 to 6.0 parts by weight. If desired, the polymerizable layer can also contain a thermal addition polymerization inhibitor in an amount from 0.001 to 6.0 parts by weight.

Figure 2:
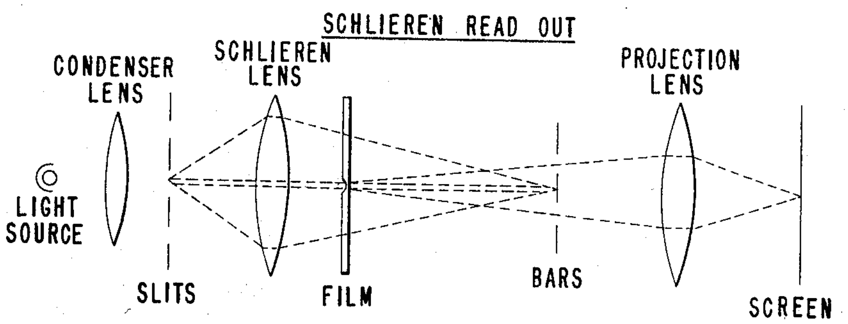

In one important aspect of the invention, step (2) of the foregoing process can be carried out optically by directing a light beam with a narrowly defined edge or comprising parallel or divergent light at the surface of the exposed layer so as to reveal the refractivity gradient (see FIG. 1) at the boundary between the insoluble polymer image areas and the remaining unexposed areas, e.g., by schlieren projection (see FIG. 2) or shadow optics techniques (see FIG. 3).

In another important aspect of the invention, step (2) of the foregoing process can be carried out by use of internal and/or surface light scattering to reveal differences in void content, roughness, or reflectivity between the polymerized image areas and remaining unexposed areas.

In still another important specific aspect of the invention, step (2) can be accomplished by removing the unexposed image areas, e.g., by means of a solvent, brushing or both and then applying ink by normal lithographic techniques to the polymerized image areas and printing on an ink-receptive surface.

Step (2) of the foregoing process can also be accomplished electronically by scanning the recorded layer, over a conducting backing, with a low-energy electron beam, and reading the anode current which varies in magnitude between the exposed and non-exposed areas due to differences in conductivity and/or thickness and/or secondary electron emission.

Step (2) of the foregoing process can also be performed electrostatographically, by electrically charging the recorded surface, dusting with a commercially available electrostatic toner powder which adheres selectively to exposed (polymerized) areas due to the lower conductivity thereof, and fixing the powder in the image areas by heat or solvent action.

The polymerizable layer should be relatively thin, e.g., from about 0.1$\mu$ to about 3.0 mils in thickness. It can be either an unsupported or a supported layer. Preferably, however, the polymerizable layer is on a transparent film or plate. Suitable transparent supports can be any of the well-known synthetic or natural polymer films, including polyesters, e.g., polyethylene terephthalate, polyamides, polyesteramides; vinyl or vinylidene polymers or copolymers, e.g., polyvinyl acetate, acrylonitrile/vinylidene copolymer, polyvinyl chloride, polyvinyl fluoride, polymethyl chloroacrylate or polystyrene; or natural or modified natural polymers, e.g., polypeptides; cellulose esters, e.g., cellulose acetate, cellulose propionate, cellulose acetate butyrate; cellulose ethers, e.g., methylcellulose and ethylcellulose; polyvinyl alcohol, polyvinyl acetate and polyvinyl acetals, e.g., polyvinyl formal and the polyvinyl acetal of acetaldehyde, polyethylene, polymethylene, and polypropylene.

Step (1) of the process as described above can be carried out in two different basic manners, patternwise; i.e., imagewise exposure to the read-in electron beam. The first such method uses a constant intensity electron beam and an electron impervious mask or stencil of the desired image. Modulation is thus achieved by the physical format of the mask or stencil, which should be an outline of the text to be read in, serving as a barrier to the electron beam. The mask or stencil should carry in clear (to the electron beam) areas the desired text to result in the formation of a positive polymer image. The reverse is also possible, in which variation the background will be electron beam clear and the image text will be electron beam impervious. In this case in the final polymerized recording the image areas will be the background, i.e., a so-called negative image will be obtained.

The second and possibly more important method of imagewise electron beam exposure involves sweeping the electron beam over the polymerizable recording member in raster fashion and at the same time imagewise varying the number of electrons arriving per unit area. This controlled variation in the number of electrons arriving in the image area can be accomplished by an intensity variation in the electron beam, by varying the beam current, by a focusing variation, i.e., by varying the focus of the beam, or by other similar variations in the electron beam generating parameters. Thus, modulation is achieved by electronic control of the electron beam. Such electronic control can come from a variety of sources well known in the electron beam art, such as TV cameras, flying spot scanners, and the like. The polymerizable stratum will be imagewise polymerized in accord with the said modulated electron beam read-in means.

In the thus exposed and thereby polymerized areas of the recorded member, firstly polymerization is achieved patternwise. As a corollary, shrinkage of the polymerizable stratum on polymerization in said polymerized or image areas will also be achieved in measure of the polymerization and thus also in measure of the modulated electron beam read-in. The exposed or read-in areas of the recorded member are shrunken sensibly, i.e., a patternwise intaglio image is formed, but the contrast of the image is very low by visual examination.

The exposed polymerizable layer thus has impressed within its structure a polymeric image. In the image or exposed areas one or more ethylenically unsaturated, addition polymerizable component(s) has (have) been polymerized, and, accordingly, these image areas differ in chemical structure from the nonimage, i.e., unexposed, areas. Thus, unlike many previously known information storage and retrieval processes, that of the present invention has built-in permanence. Similarly, because of properties necessarily inherent in the preparation of the polymerization recorded image, the thus obtained images will be free of graininess or any inherently comprised structure pattern. Accordingly, the thus obtained polymerization recorded images inherently have extremely high resolution capacities.

Read-out of the impressed image, i.e., the polymer image in the exposed or image areas, can be effected by certain optical or physical methods which produce a projected or visual image, or by direct print out of single or multiple copies. The preferred means will depend upon the resolution desired and the particular type of recording. Moderately high resolution recording of up to 1000 lines/inch will be arbitrarily referred to as high density storage or microstorage, while very high resolutions, greater than 1000 lines/inch, will be classed as ultramicrostorage. Polymerization recording can be used for direct recording of facsimile or α-numeric information and for recording of analogue and digital information generally.

Direct optical read-out depends on the gradient in refractivity at the boundary between polymerized and unpolymerized regions. Schlieren optics or shadow optics can be used to enhance the contrast or light intensity difference corresponding to the refractivity gradient. Read-out by schlieren optics is especially useful in the microstorage of facsimile information because of the ease of obtaining bright, well-resolved images of good contrast.

Figures 4, 5:
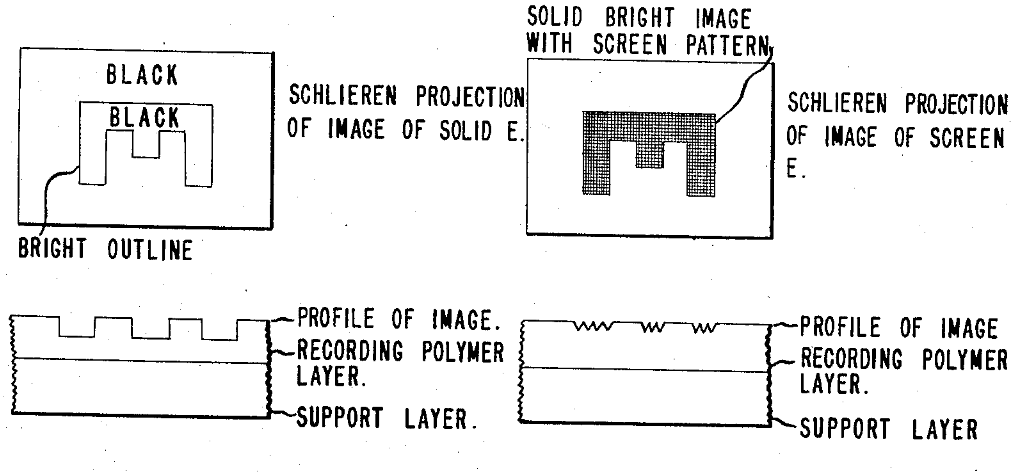

Read-out by schlieren projection (see FIG. 2) depends on the discontinuities in the electromagnetic refractivity existing at the interfaces between exposed and unexposed areas. In those areas of the record where there is a discontinuity, e.g., a gradient (see FIG. 1) in total optical refraction on schlieren projection there will be transmitted a bright zone, i.e., the optical discontinuity permits transmission of the projected light source through the second set of schlieren bars. Accordingly, depending on the nature of the modulating image in the electron beam read-in, there will be obtained, variously, light images on a dark background or dark images on a light background on schlieren projection. Thus, using the symbol E for illustrative purposes, various projected images will be obtained, as described in the following, depending on the character of the modulating E used as well as the read-in techniques. If a solid E is used to modulate a broad, uniform electron beam, upon schlieren optical projection of the patternwise-polymerized record there will be obtained a light outline E on a black background. The internal solid parts of the projected image will also be black (see FIG. 4). If instead of a solid E a screen E is used as the modulating image, then on schlieren projection of the thus exposed, polymerized, recorded member there will be obtained a solid light E on a dark background (see FIG. 5). Conversely, if a solid E is used as the modulator and a screen or raster or bars is used in all the background areas on electron beam read-in, then on schlieren projection of the thus modulated, polymerized record, there will be obtained a solid dark E on a wholly light background. The same three respective schlieren projection images will also be obtained if the modulating means are, respectively, an electron beam opaque sheet with an E opening, the same with a screen or raster or bars placed in the E opening, and, finally, a complete screen or raster with an E opening.

Figure 6:
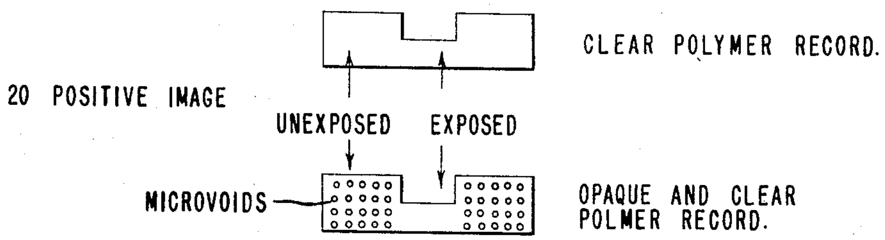
Figure 7:
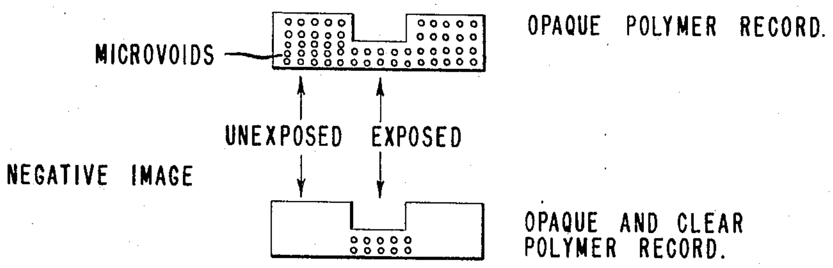

Clear recorded polymer images comprising only the refractivity and thickness gradients described earlier can be converted to black and white images yet another way. To accomplish this, the non-image or unpolymerized areas are opacified by swelling the polymeric binder, then removing the swelling agent with a second solvent that does not swell the binder. This leaves many very fine light-scattering voids in the structure due to loss of monomer, polymer, and/or swelling agent. The completely polymerized image areas are highly cross-linked and are therefore not affected by the swelling agent. It has been found that partial opacification occurs when there is an intermediate degree of polymerization. Thus, the method can be used for the recording of continuous tone as well as of line and halftone originals. Recordings selectively opacified in this way give positive clear regions on opaque backgrounds which can be viewed directly or projected as desired. This is illustrated schematically in FIG. 6 of the drawing. These opacified records can be dyed to give black image regions in the opacified areas. The type of image that results from electron exposure of a pre-opacified layer is shown in FIG. 7 of the drawing. Subsequent pressure removed the voids from the non-image areas, but not from the image areas, resulting in a complementary image to that of FIG. 6 as shown schematically in FIG. 7.

Figure 8:
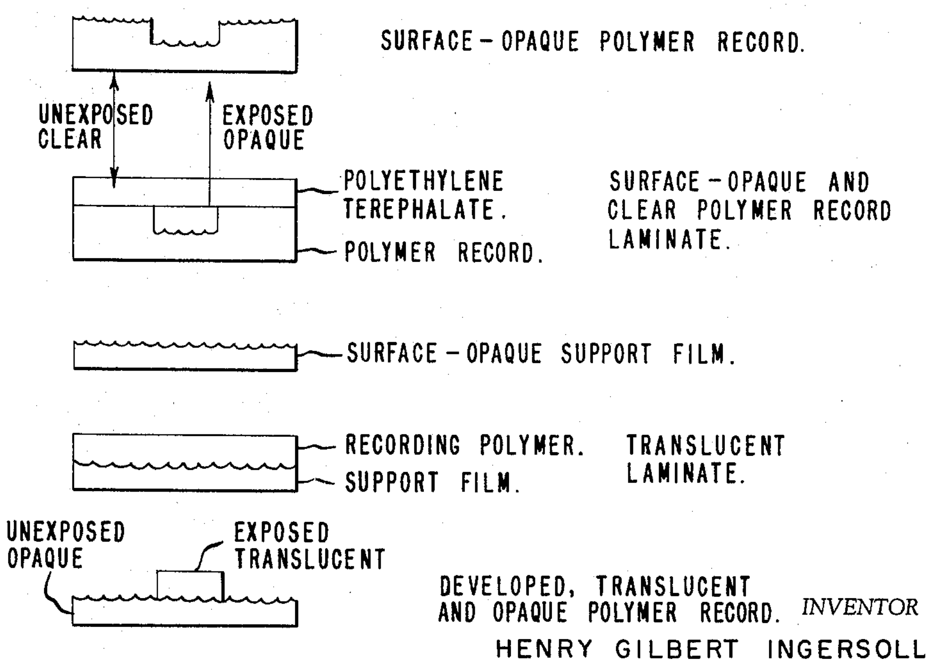

Yet another way to convert the polymer image to a black and white image is described in the following: Certain types of recording polymer exhibit a pronounced surface haze or opacity, for example, if solvent is evaporated very rapidly during casting or if the film contains various additives. It has been found that when records are made upon these surface-opaque recording polymers and the records are then laminated by means of heat and pressure to a clear film, e.g., polyethylene terephthalate, the image areas remain opaque while the non-image areas laminate to the surface of the clear film and become clear. The composite laminated film may then be read-out by conventional projection giving a negative image or by schlieren projection which yields a positive image of excellent contrast. Alternatively, the recording polymer may be cast on a support film with surface opacity. The composite film is translucent to transparent, depending upon how closely the refractive indices match. The composite film is then recorded upon and the unpolymerized, non-image areas dissolved away. This leaves a transparent to translucent image on an opaque background. The process just described is shown schematically in FIG. 8 of the drawing.

Ultramicrostorage polymer records can be read out by optical microscopy with a well-collimated light source.

An especially outstanding way to read out digital information comprises the use of very high optical magnification, 1000× or more, with the images slightly out of focus to enhance the density differential. This is in essence the method of shadow optics. Shadow optics techniques can also be used for projection read-out using a point light source, see Example XXI.

Figure 9:
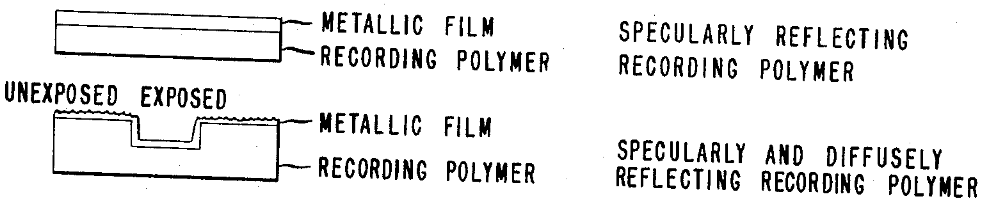

It has been discovered, in accordance with the invention, that a recording polymer film prepared with a reflective surface, for example, with a metallic coating or rendered opaque by a suitable dye, shows striking contrast if recorded upon and then heated. This is due to the fact that the polymerized areas reflect light specularly while the unpolymerized background areas reflect light diffusely. In FIG. 9 of the drawing this procedure is shown schematically. Minor improvements in image contrast can be obtained by use of reflection microscopy with a reflective layer, e.g., metal or dyed film below the polymer record layer or with a reflective metal layer superimposed over the image and applied after polymerization. In some cases minor improvements in image contrast or resolution can be obtained by phase contrast microscopy by metal shadowing techniques, or by use of polarized light. Interferometry techniques are also useful for read-out of ultramicrostorage records.

Image and nonimage areas of the recorded polymer stratum differ in electrical resistivity by one to three orders of magnitude depending on relative humidity. If the polymer record is charged by a corona discharge, and the charged record allowed to stand for a time sufficient for the better-conducting nonpolymerized areas to discharge, the image can be sensed by electrical induction, or it can be rendered visible by development with a charged powder or ink. Permanent images can be obtained by fusing the ink containing a thermoplastic bonding agent to the film.

Multiple copies of the original can be obtained from polymer records, depending on the choice of ink used, when supported by conventional hydrophobic substrates or when supported by such hydrophilic substrates as aluminum or paper. After exposure the non-image areas of the plate are removed by a solvent. The plate is then placed on an offset press and used to print the desired copies by lithographic techniques.

As stated previously, the preferred compositions are those which give a solid polymerizable stratum on the requisite transparent film support. With such, using the preferred high speed, high resolution, high packing density modulating electron beam read-in, it will normally be that the minimum exposure will be about $1\times10^{-4}$ watt-sec./cm.$^2$. This exposure may be obtained, for example, by 1 sec. at $1\times10^{-4}$ watts/cm.$^2$ (e.g., electron microscope) or $1\times10^{-7}$ sec. at $1\times10^{3}$ watts/cm.$^2$ (beam writer). Such read-in intensity-time parameters correspond to the extremely low spot dwell time of $1\times10^{-7}$ sec., which corresponds to a write-rate of $1\times10^{5}$ cm./sec. for a 0.1 diam. beam. Density of the recorded image of 0.5–1.0 above background is easily obtainable, and resolution is better than 400 read-in lines/mm. To achieve these high resolution values, it is desirable that the polymerizable composition shrink during read-in from 10 to 20% by volume.

The following examples, in which the parts given are by weight, are submitted to further illustrate but not to limit the invention.

EXAMPLE I

A solution of 25 parts of cellulose acetate/hydrogen succinate (1.85 acetate DS, 0.7 hydrogen succinate DS) in 180 parts of methyl ethyl ketone and 10 parts of water, was filtered through a double cloth layer in a pressure filter. To 21.5 parts of the resultant solution there was added with stirring 1.38 parts of triethylene glycol diacrylate, which had been purified by passing through an approximately equivalent volume of 48–100 mesh commercially available activated alumina. The resultant solution was cast with a 10-mil knife clearance on a 4-mil thick sheet of commercially available polyethylene terephthalate film base. The dried polymerizable stratum on the film base was placed in a cathode ray tube and covered with a 325-mesh wire screen. The tube was evacuated and electron beam exposure carried out using about an 0.5 mm. diameter beam with a horizontal sweep of 60 cycles per second and a vertical sweep of 2730 cycles per second pulsed on for 0.004 second, i.e., one raster or less, with a 25 kev. accelerating voltage and an 11.4 microamp beam current. The dwell time of the beam was $2\times10^{-6}$ seconds, which corresponds to a beam traverse rate of 25,000 cm./sec. The exposed film was removed from the beam tube and heated for five minutes at 136° C. Light projected, using schlieren optics, through the thus treated film resulted in clear, well-resolved, white lines on a black background corresponding to the mesh screen. Black and white photographs of the projected image likewise resulted in clear, well-resolved lines corresponding to the mesh screen.

EXAMPLE II

As in Example I, a four-mil thick, commercially available polyester film base on a plate glass support was doctor-knife coated at a knife clearance of five mils with a solution made up from 21.5 parts of a mixture of five parts of the same cellulose acetate/hydrogen succinate, 36 parts of acetone, and two parts of water, said solution being mixed with 1.38 parts of purified triethylene glycol diacrylate and 0.020 part of $\beta$-methyl-anthraquinone initiator. The coated film was dried for about 30 minutes under a cover and then removed from the plate glass substrate. In general as in Example I, the coated film base was placed in an electron microscope and covered with a 1000-mesh wire screen. The tube was evacuated and the assembly was exposed to a relatively wide 50 kev. electron beam of intensity $1.7\times10^{-4}$ watt/cm.$^2$ for 100 seconds. The exposed film was removed from the beam tube and heated for five minutes at 136° C. Projection of the thus treated film, using a schlieren optical system, resulted in a well-resolved pattern of the 1000-mesh screen with clear sharp lines of good intensity defining the screen grid.

EXAMPLE III

A solution was prepared by rolling overnight 25 parts of the cellulose acetate/hydrogen succinate of the preceding examples with 180 parts of methyl ethyl ketone and 10 parts of water. The resultant solution was pressure filtered and to 10.75 parts of the filtered solution was added with stirring 1.75 parts of purified pentaerythritol tetraacrylate and 0.0175 part of $\beta$-methylanthraquinone initiator. As before, a four-mil thick commercially available polyester film base on a plate glass support was doctor-knife coated with this solution using a knife clearance of 10 mils. The film was dried and exposed as in Example II through a 160-mesh wire screen under vacuum to a 50 kev. electron beam of intensity $1.7\times10^{-4}$ watts/cm.$^2$ for ten seconds. The exposed film was removed and heated for five minutes at 136° C. Light projected through the exposed and heated film, using a schlieren optical system, produced a visible image of the screen with clear lines and sharp definition.

EXAMPLE IV

Another 21.5-part batch of the cellulose acetate/hydrogen succinate/acetone/water solution, prepared as in Example I, was mixed with 2.0 parts by volume corresponding to 2.0 parts of water of purified glycerol triacrylate and 0.037 part of benzoin methyl ether initiator. The resulting solution was coated as before on four-mil thick, commercially available polyester film base on a plate glass support using a doctor knife with a 10-mil opening. After drying, the polymerizable layer on the film base was placed under a 160-mesh screen and exposed to a beam of 50 kev. electrons as before in vacuo at a $1.7\times10^{-4}$ watt/cm.$^2$ beam intensity for 100 seconds. The exposed film was removed and heated for five minutes at 136° C. Light projected through the exposed and heated film, using a schlieren optical system, resulted in a clear, sharp, well-defined, good contrast image of the 160-mesh screen.

EXAMPLE V

Another 21.5 part portion of a cellulose acetate hydrogen succinate/acetone/water solution as in the preceding examples was mixed with 1.3 parts by volume corresponding to 1.3 parts of water of trimethylolpropane trimethacrylate and 0.013 part of benzoin methyl ether initiator. A four-mil commercially available polyester film base on a plate glass support was coated by a doctor knife with the resulting solution at a 10-mil knife opening. After drying, the coated film was placed under a 160-mesh metal screen and exposed as before to a 50 kev. electron beam at an intensity of $1.7\times10^{-4}$ watts/cm.$^2$ for 30 seconds. The exposed film was removed and heated at 136° C. for five minutes. Light projected through the exposed and heated film using a schlieren optical system resulted in a clear, sharp, well-defined, good contrast image of the 160-mesh screen.

EXAMPLE VI

Another 21.5-part portion of the cellulose acetate hydrogen succinate/acetone/water solution described in Example I was mixed with 1.37 parts of diallyl succinate and 0.013 part of benzoin methyl ether initiator. As before, a four-mil thick, commercially available polyester film base on a plate glass support was doctor-knife coated with the resulting solution at a 10-mil knife opening. After drying the coated film was placed in an electron beam tube under a 160-mesh wire screen. The tube was evacuated and the screen-coated film exposed to a 50 kev. electron beam at an intensity of $1.7\times10^{-4}$ watts/cm.$^2$ for 100 seconds. The exposed film was removed and then heated at 136° C. for five minutes. Light projected through the exposed and heated film, using a schlieren optical system, resulted in a clear, sharp, good contrast, good definition image of the 160-mesh screen pattern.

EXAMPLE VII

A 21.5-part portion of a filtered solution of 25 parts of the cellulose acetate/hydrogen succinate of the preceding examples in 180 parts of methyl ethyl ketone and 10 parts of water was mixed with 3.5 parts of pentaerythritol triacrylate. The solution was then cast on a commercially available photographic polyester film base four mils thick with a doctor knife set at 5 mils. The solvent was allowed to evaporate resulting in a polymerizable layer containing about 58% of the pentaerythritol triacylate monomer on the film base. The thus prepared film was exposed as described in detail in the preceding examples through a 450-mesh stainless steel screen to a 50 kev. electron beam for an exposure of 0.55 watt-sec./cm.$^2$. The exposed film was removed and on light projection therethrough using a schlieren optical system, the screen image was readily visible. The thus projected image was photographed and the resulting photographic negative on densitometry determination showed the image areas to have a density of 0.95 photographic exposure units vs. a background density of 0.47 resulting in a density difference for the image of 0.48.

The exposed film was then heated for five minutes at 136° C. and the screen image again obtained by projection using schlieren optics. On photographing the projected image and determining the density of the negative by densitometry, it was found that the image areas exhibited a density of 1.15 and the backgound a density of 0.28 resulting in a density difference for the image area of 0.87.

EXAMPLE VIII

A solution was made up of five parts of the cellulose acetate/hydrogen succinate of the preceding example in 38 parts of acetone and two parts of water. To 21.5 parts of this solution was added two parts by volume, corresponding to two parts of water, of glycerol triacrylate purified by filtrtion through $Al_2O_3$ and 0.037 part of benzoin methyl ether initiator. The resultant solution was cast with a doctor knife set at a 10-mil opening onto a commercially available four-mil thick polyethylene terephthalate film base. The solvent was allowed to evaporate and the resultant photopolymerizable stratum containing 45% glycerol triacrylate on the polyester film base was exposed as in the preceding example through a 450-mesh screen to a 50 kev. electron beam of intensity $1.7\times10^{-4}$ watts/cm.$^2$. Exposures were carried out for varying times as listed in the following table. In each instance the thus exposed film was projected using schlieren optics and a black and white photograph was taken of the thus projected screen image. The density values in the following table were obtained on the developed negative using a Welch Densicron.

| Exposure Time | Log Exposure Time | Background Density | Maximum Density | Density Difference |
|---|---|---|---|---|
| 10 seconds | 1.0 | | | Medium.[1] |
| 25 seconds | 1.39 | 0.17 | 1.0 | 0.83 (strong [1]). |

[1] Visual estimate.

EXAMPLE IX

A solution was prepared from 25 parts of the cellulose acetate/hydrogen succinate of the preceding example, 180 parts of methyl ethyl ketone, and 10 parts of water by rolling overnight. The resulting solution was then pressure filtered and to a 10.75-part portion thereof was added 1.75 parts of a pentaerythritol tetraacrylate-triacrylate mixture, containing about 8% of the tetraacrylate,, and about 0.1% p-methoxyphenol. The resulting polymerizable solution was cast with a doctor knife set at a 5-mil opening onto a commercially available 4-mil thick polyethylene terephthalate photographic film base and the solvents allowed to evaporate at room temperaure. There was hus obtained a polymerizable stratum containing 58% of the polymerizable component by weight on the polyester film base. The resultant coated film was exposed as in the preceding example through a 450-mesh screen to a 50 kev. electron beam of intensity about $1.7\times10^{-4}$ watt/cm.$^2$ for the times indicated in the following table with the indicated results. As in the preceding example the density values are those obtained by taking a black and white picture of the projected images and measuring the density of the developed negatives using a Welch Densicron.

| Exposure Time | Log Exposure Time | Background Density | Maximum Density | Denstiy Difference |
|---|---|---|---|---|
| 3 seconds | 0.47 | 0.17 | 0.85 | 0.68 |
| 10 seconds | 1.0 | 0.17 | 0.93 | 0.76 |
| 25 seconds | 1.39 | 0.18 | 1.09 | 0.91 |
| 100 seconds | 2.0 | 0.22 | 1.15 | 0.93 |

EXAMPLE X

Twenty-five parts of crude pentaerythritol tetraacrylate was dissolved in about 75 parts of benzene and the resultant solution passed twice through 85 mil $Al_2O_3$ and the benzene then removed by distillation. A solution was prepared from 25 parts of cellulose acetate/hydrogen succinate of the preceding example, 180 parts of methyl ethyl ketone, and 10 parts water by rolling overnight. To a 10.75-part portion of this solution, filtered through a pressure filter, was added 1.75 parts of the above purified pentaerythritol tetraacrylate. The resulting polymerizable solution was cast with a doctor knife at a 10-mil opening on a 4-mil thick commercially available polyethylene terephthalate photographic film base. After the solvents had evaporated the polymerizable stratum on the polyester film base was exposed as in the previous examples through a 450-mesh screen to a 50 kev. electron beam of intensity about $1.7\times10^{-4}$ watts/cm.² for the times indicated in the following table with the resulting density variation. These density variations were obtained as explained in the preceding example.

| Exposure Time | Log Exposure Time | Background Density | Maximum Density | Denstiy Difference |
|---|---|---|---|---|
| 3 seconds | 0.47 | 0.15 | 0.47 | 0.32 |
| 10 seconds | 1.0 | 0.16 | 0.75 | 0.59 |
| 100 seconds | 2.0 | 0.18 | 1.06 | 0.88 |

EXAMPLE XI

This example illustrates lithographic read-out from electron beam read-in on a polymerizable layer supported on a lithographic paper base. A master solution of 25 parts of the above previously described cellulose acetate/hydrogen succinate in 180 parts of methyl ethyl ketone and 10 parts of water was prepared and filtered. A mixture of 10.75 parts of said master solution and 1.7 parts of the previously described, purified pentaerythritol tetraacrylate (which in fact contains on an average basis 3.5 substituted groups out of the indicated four) was prepared, and two parts of said mixture was diluted to eight parts with methyl ethyl ketone resulting in a solution at 6% solids, the solids being 42/58 cellulose acetate/hydrogen succinate/pentaerythritol tetraacrylate. The resultant solution was cast with a 3-mil open doctor knife on a commercially available lithographic paper base (Multilith "Duplimat" Master Paper) and dried resulting in a coating weight of the above composition of about 25 mg./cm.². The resultant coated film was exposed to a 50 kev. electron beam through a perforated metal stencil for an exposure of about 0.16 watt-sec./cm.². The resultant exposed film was heated for five minutes at 136° C., then rinsed with methylene chloride, and wiped several times with a cloth containing acetone to remove remaining unpolymerized material. The exposed and developed plate was mounted on a commercially available offset printing machine (a Multilith 1250 Offset Printer). The thus mounted plate was wet with a commercially available lithographic solution (Repellex Fountain Solution) and a commercially available lithographic ink (both prepared by Addressograph-Multigraph Company). On running the lithographic press by conventional techniques good printings of the read-in image were obtained.

EXAMPLE XII

This example illustrates the formation of a lithographic master on an aluminum base. Another sample of the above described 6% solids, 58% pentaerythritol tetraacrylate/42% cellulose acetate/hydrogen succinate solution was cast with a doctor knife at a 3-mil opening onto grained aluminum plates and the solution allowed to dry. The thus coated plates were exposed to a 50 kev. electron beam through 40-, 100- and 160-mesh screens for an exposure of about 0.16 watt-sec./cm.² for each plate. The exposed plates were each heated for five minutes at 136° C. The plates exposed through the first three mesh screens were washed with acetone. Each of the plates containing the mesh screen polymer images, i.e., the plates, were used as the printing masters in a commercially available lithographic press as described in the preceding example. Good printings of the mesh stencil for the 40- and 100-mesh screens were obtained. A fair quality printing was obtained from the 160-mesh plate. Visually, the resolution of the mesh image on the plate appears better resolved than the printings. Thus, the particular press, sample size, paper, and possibly ink used were not suited to the highest resolution. The polymerizable strata in the aforesaid plates were approximately 1.5 micron thick as judged by interferometry techniques.

Similar results were obtained using other polymerizable strata on the same type grained aluminum bases containing 42% of the cellulose acetate/hydrogen succinate and 58% of various polymerizable monomer components. The electron beam exposures were carried out for exposures of 0.017, 0.034, 0.09, 0.17, 0.45, and 0.9 watt-sec./cm.². In all instances, copies of the modulating mesh stencil were obtained in the polymerized record with varying reproduction properties as a function of both the exposure intensity and the particular polymerizable component used. The polymerizable components used included glycerol dimethacrylate, glycerol trimethacrylate, glycerol diacrylate, diallyl maleate, diallyl succinate, butane-1,2,4-triol trimethacrylate, trimethylolpropane trimethacrylate, tetramethyleneglycol dimethacrylate, pentaerythritol triacrylate, triethyleneglycol diacrylate, polyethyleneglycol diacrylate, triallyl cyanurate, and dipentaerythritol tetraacrylate. From these variations in the polymerizable component, it is apparent that the acrylate esters are superior to the methacrylate esters and the latter to the allylic compounds with respect to both speed of polymerization and image quality of the polymerized record. The most outstanding of the polymerizable components from the just-described list are pentaerythritol triacrylate and tetramethyleneglycol dimethacrylate. In general, in the development of the polymerized record for lithographic reproduction the use of ethyl alcohol/acetone mixtures appeared quite desirable. In the development stage it normally proved advantageous to pull a brief press run of the polymer record prior to complete development, i.e., to run a preliminary development and then ink the plate and also treat with the lithographic fountain solution, run a few proofs, and then complete the development with the alcohol/acetone mixtures. Plates so handled were better in detail and fidelity and also apparently in plate life, i.e., exhibited superior wear resistance.

EXAMPLE XIII

This example illustrates conductivity or xerographic read-out. A polymerizable monomer/polymer solution was prepared as described in the preceding examples, varying in that it contained 34% pentaerythritol tetraacrylate and 66% cellulose acetate/hydrogen succinate. This polymerizable solution was cast with a doctor knife at a 5-mil opening onto a 4-mil thick, commercially available, photographic polyester film base. The coated solution was dried as before and then exposed to a 7/16 circular electron spot beam of 50 kev. electrons for an exposure of about 0.16 watt-sec./cm.². The exposed film was heated five minutes at 136° C. and then exposed to a 500-volt D.C. source to charge the exposed film positively. The thus charged plate was contacted with a commercially available xerographic toner powder which adhered to the image areas. The toner powder was fixed to the recorded polymer by brief exposure to trichloroethylene vapor. There was thus obtained an image of the exposing electron beam exhibiting fair contrast between image and non-image areas.

EXAMPLE XIV

This example exhibits read-out techniques involving conventional projection and schlieren projection. A mixture of 6.2 parts of a solution comprising 11.2 parts of pentaerythritol tetraacrylate, 3.6 parts of 10% polyethylene glycol ether (M.W., 4,000) in methanol, and 9.6 parts of methanol and 12 parts of a solution comprising 11 parts of cellulose acetate butyrate, 9 parts of cellulose acetate, 123 parts of acetone, and 57 parts of methyl ethyl ketone was made up to a total of 20 parts with acetone and cast with a doctor knife at a 5-mil opening on a commercially available 4-mil polyester photographic film base. The cast film after drying exhibited a pronounced surface haze. It was then exposed to a 50 kev. electron beam through a 40-mesh metal screen at an exposure of about 0.04 watt-sec./cm.$^2$. The thus exposed film was then laminated with a topcoat of 1 mil polyester photographic film base on the exposed surface, the lamination being achieved with an electric iron at about 140° C. As examined visually, the image areas were hazy and the background, i.e., unpolymerized areas, were clear. The lamination protects the recorded member from damage during repeated read-out. Read-out using the laminated, exposed film in a conventional optical projector gave a negative image with fair contrast. Read-out of the exposed, laminated film using a schlieren optics projector gave a positive image of excellent contrast. It is to be noted that the entire image area, i.e., the polymerized area, is shown up as white rather than just the boundaries thereof.

EXAMPLE XV

This example illustrates the formation of positive images by opacification. A 21.5-part portion of a solution of 25 parts of cellulose acetate/hydrogen succinate, 180 parts of methyl ethyl ketone, and 10 parts of water was mixed with 1.3 parts of pentaerythritol tetraacrylate. The resulting solution was cast with a doctor knife at a 10-mil opening on a 4-mil commercially available polyester photographic film base and then dried as before. Three such films were exposed to a 50 kev. electron beam at an exposure of 0.08 watt-sec./cm.$^2$ through 40-, 100- and 160-mesh metal screens. The exposed films were immersed for one second in dimethylformamide, washed in water at room temperature, and then washed in water at 65° C. The three films gave very good image contrast. The thus opacified films were dyed by immersion in aqueous 0.8% crystal violet plus 1.6% dimethylformamide for two minutes. The clear image, i.e., polymerized areas, did not dye appreciably but the opacified, i.e., nonpolymerized, background areas dyed deeply, greatly enhancing the image contrast. The clear, opaque, and dyed opaque areas exhibited optical densities of, respectively, 0.00, 0.41, and 2.10.

EXAMPLE XVI

A one-inch circle of a solid polymerizable film comprising a clear 4-mil thick polyethylene terephthalate support having superposed thereon an 0.3-mil thick, clear, solid layer containing a homogeneous mixture of 66% of the above described cellulose acetate/hydrogen succinate polymeric binder and 34% of pentaerythritol tetraacrylate polymerizable plasticizer was covered with a circular aluminum foil mask containing 12 evenly distributed 0.5-mm. diameter holes and placed in the exposure cavity of a commercially available (Applied Research Laboratories, Glendale, California) electron microprobe with the foil mask toward the electron microbeam source. The electron beam was adjusted for a spot diameter of approximately 10 microns. The undeflected beam was positioned just off the edge of one of the 0.5-mm. holes in the mask and the beam then interrupted by interposing a metal sheet serving as a beam block or gate between the beam source and the composite foil/film target. With the electron beam thus interrupted, the deflection system of the instrument was adjusted to provide a raster of lines which would fall across the hole and thus expose the polymerizable film sample. Exposures were made by manually opening and closing the gate during the generation of a single raster. In all instances, the beam diameter was kept at approximately 10 microns, the anode voltage was 25 kev., there were 24 lines per raster, the vertical sweep velocity of the beam was 0.0625 cm./sec., and the horizontal sweep velocity was 1.5 cm./sec. Four exposures were carried out with beam currents of, respectively, $0.6\times10^{-3}$, $1.0\times10^{-3}$, $1.5\times10^{-3}$, and $2.0\times10^{-3}$ microamperes. In all four instances rasters were successfully recorded. Photomicrographs of the second and third samples obtained using reflected polarized light at 120× magnification showed the rasters in excellent detail. The line resolution for these exposures is approximately 50 lines/mm.

EXAMPLES XVII

Another set of films handled as described in Example XVI was similarly exposed with the indicated variations in vertical and horizontal sweep velocities, beam currents, and lines per raster. In this series the beam diameter was adjusted for approximately one micron maintaining the anode voltage at 25 kev.

| Exposure No. | Sweep Velocities (cm./sec.) | | Beam Current, Micro-amperes | Lines Per Raster |
|---|---|---|---|---|
| | Vert. | Horiz. | | |
| 1 | .0625 | 6.25 | $.4\times10^{-3}$ | 100 |
| 2 | .0625 | 12.5 | $.4\times10^{-3}$ | 200 |
| 3 | .125 | 12.5 | $.4\times10^{-3}$ | 100 |
| 4 | .125 | 12.5 | $.8\times10^{-3}$ | 100 |
| 5 | .0625 | 12.5 | $.8\times10^{-3}$ | 200 |
| 6 | .0625 | 6.25 | $.8\times10^{-3}$ | 100 |
| 7 | .0625 | 6.25 | $10^{-3}$ | 100 |
| 8 | .0625 | 12.5 | $10^{-3}$ | 200 |
| 9 | .125 | 12.5 | $10^{-3}$ | 100 |
| 10 | .125 | 12.5 | $2\times10^{-3}$ | 100 |
| 11 | .0625 | 12.5 | $2\times10^{-3}$ | 200 |
| 12 | .0625 | 6.25 | $2\times10^{-3}$ | 100 |

Distinct, clear, and easily detectable rasters were obtained from all these exposures. The rasters so obtained can be viewed on an ordinary microscope using transmitted light at magnifications of 625× and 1250×. Line resolutions for these exposures are 200 lines/mm. for the 100-line rasters and 400 lines/mm. for the 200-line rasters.

EXAMPLE XVIII

This example illustrates polymerization recording of images by electron beam-read-in using as the modulating means halftone or continuous tone transparencies of the original, either negative or positive. A positive transparency in a scanner produces a positive image in the write-in tube and a negative, a negative. The necessary circuit components and read-in techniques and means will be more fully comprehended from the attached schematic FIG. 10, in which component 1 is a conventional TV video signal generator, such as a B and K TV Analyst Model 1076 containing, as indicated, a typical 70° television deflection yoke such as a Thordarson Company Type Y–19 yoke on a conventional scanning cathode ray tube and a suitable positioning means for inserting the transparency being used as a modulator (item 11) between the scanning cathode ray tube and the photomultiplier output tube (item 12), which latter is also part of the Model 1076 circuit. The thus generated, modulated video signal then goes to component 2, which is a commercially available wide-band amplifier, such as a Krohn-Hite Model DCA-10. The thus-amplified, modulated video signal, as indicated by the circuit diagram shown in FIG. 10 of the drawing, is then impressed as the modulating means on the electron beam write-in tube assembly (item 10 of FIG. 10).

Prior to exposure and the thus-described generation of a modulated, amplified video electronic signal, a suitable raster scanning system was fabricated as in the attached circuit diagram using two commercially available wave form generators such as Tektronix Tape 162 (items 3 and 4), one establishing a horizontal sweep sequence and the other a vertical sweep sequence. Suitable power amplification for driving the deflective yokes was provided by the deflection amplifiers of a commercially available oscilloscope (item 6), e.g., an Electromec oscilloscope Model 2140. The single-sweep sequence was initiated and synchronized by a single-sweep circuit of a commercially available circuit component, e.g., a Tektronix Type 5W-oscilloscope (item 5). The thus generated raster sweep sequence, as indicated in the diagram, was coupled to both the Type Y–19 yokes of item 1, i.e., the flying spot scanner, and item 8, i.e., the yoke of the electron beam read-in tube assembly (item 10).

Using this circuit, a halftone or continuous tone transparency was inserted (at position 11) in the flying spot scanner (item 1) and served as the modulating means for the coupled electron beam read-in tube assembly (item 10) in which, at position 9, had been inserted a polymerizable film of one of two types. Thus, when read-out means is to be by lithographic offset printing such as that described in Example XII, the polymerizable sample film consists of, e.g., a grained aluminum film substrate carrying superposed thereon an about 0.1-mil thick stratum of a polymerizable composition such as those previously described, for instance, a 58% pentaerythritol tetraacrylate-42% cellulose acetate/hydrogen succinate composition. On the other hand, when read-out is to be by schlieren optical projection, the polymerizable sample film at position 9 will consist of an optically transparent film support carrying superposed thereon a polymerizable stratum of the types previously described, e.g., a 4-mil thick commercially available polyester film base support with an 0.3-mil layer of 34% pentaerythritol tetraacrylate-66% cellulose acetate/hydrogen succinate polymerizable composition.

In these experiments, a one-inch square raster pattern was used with line widths from one to two mils. Recording was successfully carried out at TV writing speeds of approximately 16,000 inch/sec., with best contrast and resolution being obtained at speeds of 4,000 inch/sec. at line widths of two mils with a total raster of 200 lines.

With these components and techniques, the sweep sequence as just described was established by the two indicated wave form generators in conjunction with the power amplification and synchronization by the indicated oscilloscopes (items 3, 4, 5, and 6). The power amplification for the electron beam deflection circuits was provided by the yoke-drive amplifiers of item 6 which fed the two yokes (items 7 and 8) of, respectively, the flying spot scanner (item 1) and the electron beam write-in tube assembly (item 10, containing components 8 and 9). The flying spot scanner and beam write-in tube were thus driven simultaneously by the sweep sequence.

The image to be recorded, i.e., the photographic transparency at position 11, being scanned by item 1 with impressed sweep sequences as above resulted in modulation of the signal transmitted to the photomultiplier tube (12) of item 1 by the flying spot scanner tube (item 7, also of item 1). The scanner thus generated an intensity modulated video signal from the photomultiplier tube (12) of item 1, which was suitably amplified by the wide band amplifier (itsm 2) to feed the electron beam read-in tube assembly (item 10). This amplified video signal from the flying spot scanner thus drove the cathode of the beam write-in tube assembly (item 10) to cause the electron beam intensity to vary according to the image brightness of the photographic transparency being recorded and accordingly to effect correspondingly different degrees of polymerization in the polymerizable stratum of the recording polymer film sample at position 9 in the demountable cathode ray tube assembly 10.

Using this intensity modulation technique, the differing degrees of optical density in the image to be reproduced electronically (item 11) varied the intensity of the electron beam read-in as the raster write-in proceeded. The thus-recorded polymeric image obtained in the film at position 9 showed a change in depth of the recorded line with image brightness, wherein the brightest areas of the modulating transparency resulted in the deepest lines in the recorded polymer image. As indicated above, the modulating transparency can be either a halftone or continuous tone transparency, either positive or negative, and the polymerizable read-in film can have either a transparent polymeric substrate or a grained metal, usually aluminum substrate, depending on, respectively, whether read-out is to be by schlieren optical projection or offset lithography.

Further details of the particular circuit components used and the parameters with which the exposures were carried out follow; however, it is obvious that within the purview of the broad invention, other known conventional circuit components and/or variable parameters can be used with equal success. The electron beam write-in assembly (item 10) consisted of a demountable cathode ray tube in a suitable glass envelope having a demountable base for inserting sample 9 and coupled, as indicated, to a conventional vacuum pumping system consisting of a mercury-vapor diffusion pump backed by a conventional oil pump with suitable vacuum gauges for checking the operating vacuum. The beam tube itself contained a commercially available electron gun (a Westinghouse WX–4685 Model) with allied external power supplies comprising 150-volt grid bias control, 0–600 volt D.C., 0–10 kv., and 10–30 kv. power supplies.

The raster read-in was one inch in both the horizontal and vertical directions. The horizontal sweep time for the 4,000 inch/sec. read-in was 250 microseconds, and for the 16,000 inch/sec., 62.5 microseconds. The vertical sweep time was 50 milliseconds and the beam diameter was 1–2 mils. The anode voltage was 25 kv., and the beam current at peak was two microamperes. The exposure was approximately $1 \times 10^{-3}$ watt-sec./cm.$^2$, the beam intensity was approximately 2,000 watt/cm.$^2$, and the exposure time was approximately 500 nanoseconds at the 4,000 inch/sec. rate and 50 nanoseconds at the 16,000 inch/sec. rate since the beam diameter in the latter was reduced to one mil. Using the just described instrumentation and techniques and 34/66 pentaerythritol tetraacrylate/cellulose acetate hydrogen succinate compositions on clear polyethylene terephthalate film and grained aluminum sheet supports good resolution copies of continuous tone and halftone transparencies were obtained with read-out by, respectively, schlieren projection and offset lithography.

EXAMPLE XIX

Figure 10:
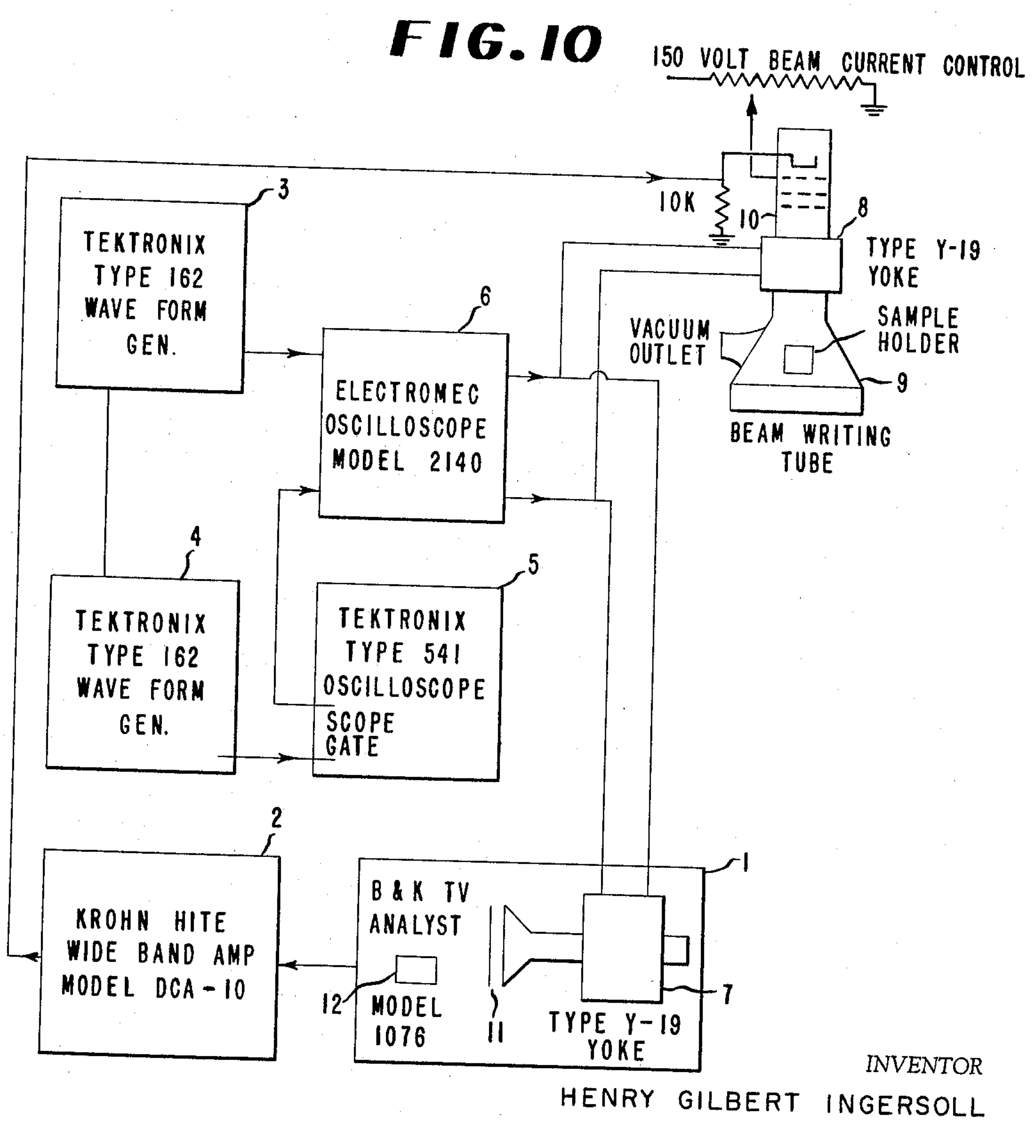
Figure 11:
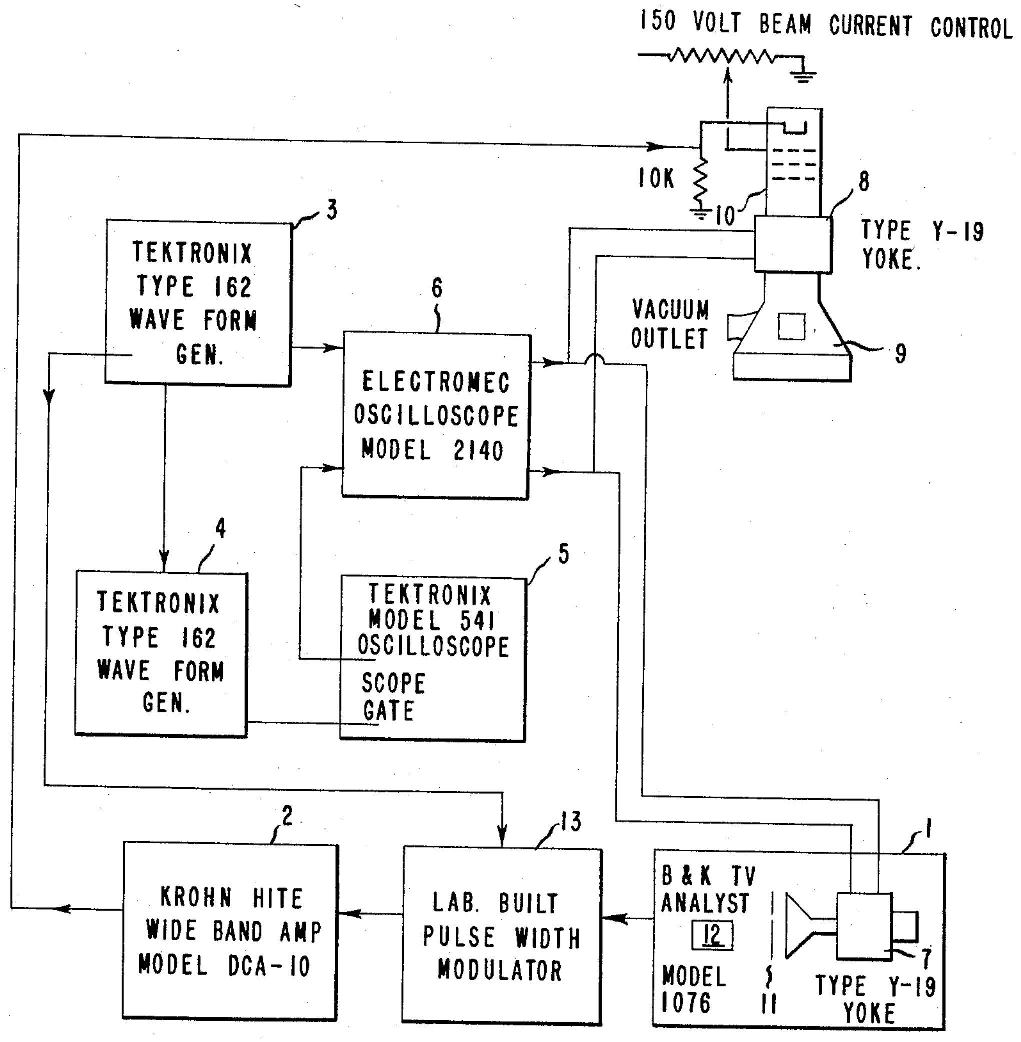

Similar results to those just described in Example XVIII were obtained using a somewhat modified circuit as indicated in attached FIG. 11 which is identical with that in FIG. 10, except for item 12, a pulse width modulator. In this technique, called also "pulse time" and "duty cycle" modulation, the electron beam records at constant intensity but is turned on and off at regular intervals with very many such intervals occurring during a single horizontal line scan. The modulation process causes the "on" versus the "off" time ratio of the pulse beam to vary according to the brightness requirement of the image being scanned.

Thus, this pulse width modulated signal drove the electron beam tube write-in assembly in accord with the coupled scanning yoke sweeping sequence circuit and resulted in a modulated electron beam write-in signal which was of constant intensity but width modulated in accord with the image being scanned. Thus, an image was produced with a dashed line pattern, in which variable dash length produced a variable area type of recording similar to halftone printing. Images of good contrast in the read-in polymerized film were thus obtained and, as in Example XVIII, were read-out by both schlieren optical projection and lithographic offset printing. Using the just described instrumentation and techniques and 34/66 and 58/42 pentaerythritol tetraacrylate/cellulose acetate hydrogen succinate compositions on clear polyethylene terephthalate film grained aluminum sheet supports good resolution copies of continuous tone and halftone transparencies were obtained with read-out by, respectively, schlieren projection and offset lithography.

EXAMPLE XX

This illustrates electron beam write-in from a halftone text with read-out by shadow optics. A halftone portrait transparency was used as the modulating means in an electron beam read-in such as that described in the preceding Examples XVIII and XIX using, for the recording member, an 0.7 mil thick layer of a 34/66 pentaerythritol tetraacrylate/cellulose acetate hydrogen succinate polymerizable layer on a 4-mil thick transparent polyester film base. The thus imagewise electron beam exposed and accordingly polymerized record was read-out by projection therethrough with a commercially available two-watt enclosed concentrated zirconia arc lamp (Sylvania Model A–2) onto a conventional projection screen. On such projection there was obtained an enlarged negative image on a light background of the text on the original halftone transparency used as the modulating means.

EXAMPLE XXI

This example illustrates the duplication of a halftone facsimile recording with opacification. A sample of recording polymerizable film similar to those described in the foregoing examples containing 34% pentaerythritol tetraacrylate (containing as described in the foregoing a certain proportion of the triacrylate) with the remainder of the polymerizable recording film consisting of the foregoing described in cellulose acetate/hydrogen succinate, the said photopolymerizable layer being about 0.35-mil thick carried on a 4-mil transparent polyester photographic film base support, was exposed to an electron beam write-in assembly as in Example XVIII using a halftone negative containing a portrait record as the modulator (item 11). The thus-exposed polymerized recording member was heated for five minutes at 136° C. The thus-heated, exposed member was immersed for one second in dimethylformamide, then washed in water at room temperature until no further color change, then washed in warm (65° C.) water until temperature equilibrium was reached and finally dried. Read-out of the thus written-in halftone portrait was achieved several ways. Thus, a positive black and white image of the portrait was obtained by optical transmission or projection of the thus-exposed and developed record in a conventional 35-mm. photographic still projector. Conversely, a negative black and white image of the original portrait was observed in read-out by direct optical reflection.

EXAMPLE XXII

This example illustrates the modification of polymerization recording wherein the final image is reinforced by metallizing before electron beam recording. A sample of recording photopolymerizable film having an about 0.35-mil thick polymerizable stratum consisting of 58% of pentaerythritol tetraacetate (containing about 92% of pentaerythritol triacrylate) with the remainder being the above-described cellulose acetate/hydrogen succinate on a 4-mil thick photographic-grade polyethylene terephthalate film base was coated with a transparent layer of metallic aluminum less than 400 angstroms thick. The metal was evaporated from a tungsten wire spiral by conventional technique—see, for example, "Vacuum Depositon of Thin Films," L. Holland, John Wiley, New York, 1958. The thus coated film was exposed to a 50 kev. electron beam through 450- and 40-mesh wire screens for an exposure of approximately 0.17 watt-sec./cm.$^2$. The thus exposed polymer stratum was then developed by heating for five minutes at 136° C. Read-out with good contrast was obtained by transmitted light with a conventional microscope and by reflected light with a metallurgical microscope.

EXAMPLE XXIII

This example illustrates the electron beam read-in on a metallized, polymerizable recording member with read-out by a scanning electron beam. A polymerizable recording member consisting of a 4-mil thick, transparent, polyethylene terephthalate film base support carrying approximately a 1.0$\mu$-thick layer of metallic aluminum (deposited by vacuum deposition) having superposed thereover an 0.15-mil thick polymerizable layer containing 34% of pentaerythritol tetraacrylate and 66% of the previously described cellulose acetate/hydrogen succinate binder was exposed through a 450-mesh screen to a 50 kev. electron beam from a commercially available electron microscope at an exposure of about 0.17 watt-sec./cm.$^2$. The thus exposed and polymerized recording member was then heated for five minutes at about 136° C. Read-out of the thus exposed and developed recorded member was effected using a commercially available electron microprobe as described in Example XVI with a beam current of 0.03 microamp, an anode voltage of 10 kv., a horizontal scan of one millisecond/cm., and a vertical scan of one second/cm. with a field width of 1050 microns (70× magnification). Read-out was achieved through the target current as modulated by the polymerized record member. The thus modulated target current from the scanning beam was displayed on a fluorescent screen, thereby showing a good contrast replica of the recorded polymer image, i.e., the 450-mesh screen pattern. This shows that in this system of polymerization recording, both read-in and read-out can be effected by electron beam techniques and that the desired read-out information can be obtained directly in electrical form suitable for direct circuit coupling to any visual, permanent storage, multiple copy, machine encodable, or the like, ultimate read-out means.

EXAMPLE XXIV

This example illustrates the wide variation possible in the polymeric binder component while still maintaining satisfactory lithographic read-out quality. The various polymerizable component/polymer compositions were prepared in an about 58/42 polymerizable component/polymeric binder ratio by mixing in suitable solvents, such as acetone, methyl ethyl ketone, toluene, methanol, ethanol, or water mixtures of the latter two, and casting with a doctor knife having a 3-mil opening on grained aluminum plates as in Example XII and the solvent allowed to evaporate. Exposure of the various polymerizable films on the aluminum substrate was through a perforted stencil to a 50 kev. electron beam for the indicated exposures and the image generally intensified, unless indicated otherwise, by heating at 136° C. for five minutes. The exposed plates were developed with such organic developers as acetone, a commercially available ethyl acetate/ethyl alcohol mixture, commercially available lacquer-developers, or a commercially available lithographic developer, such as asphaltum-gum-etch or mixtures thereof, as required by the solubility properties of the binder polymer. The exposed and developed plates were mounted on commercially available offset printing machines, such as a Multilith Model 1250 or an A. B. Dick Model 350, and printed by conventional lithographic techniques as described in Examples XI and XII. In all instances, satisfactory printed copies of the original metal stencil were obtained varying, as indicated, in image quality and plate life with both the specific binder and the exposures used.

*Composition A*

An about 58/42 pentaerythritol tetracrylate/commercially available polyethyl acrylate resin with vinyl ether crosslinking (American Hycar T–4021) film was laid down as described above on grained aluminum from methyl ethyl ketone to give a dry coating weight of the polymerizable stratum of 0.016 g./100 cm.$^2$. Exposures to the electron beam of 0.017, 0.034, and 0.085 watt-sec./cm.$^2$ resulted in the formation of negative images. Higher exposures such as 0.42 and 0.85 watt-sec./cm.$^2$ resulted in the formation of positive images.

*Composition B*

An about 58/42 pentaerythritol tetraacrylate/commercially available butadiene/acrylonitrile copolymer (American Hycar H–1072) polymerizable stratum was laid down from methyl ethyl ketone on grained aluminum to give a dry, polymerizable stratum coating weight of 0.012 g./100 cm.$^2$. Exposures to the electron beam at 0.17 watt-sec./cm.$^2$ gave a light image of the screen and exposures of 0.42 and 0.85 watt-sec./cm.$^2$ gave stronger images.

*Composition C*

An about 58/42 pentaerythritol tetraacrylate/commercially available 66–610–6 polyamide resin ("Zytel"[1] 62) was laid down from methanol on grained aluminum to give a dry, polymerizable stratum coating weight of 0.022 g./100 cm.$^2$. Exposures through the stencil to the electron beam of 0.017/0.034 watt-sec./cm.$^2$ resulted in light images, while exposures from 0.085 through 0.85 watt-sec./cm.$^2$ resulted in good images. These latter on printing showed excellent resistance to wear and 5,000 copies were easily obtained. The wear resistance and printing behavior were comparable to those of the previous examples based on the cellulose acetate/hydrogen succinate binders.

*Composition D*

An about 58/42 pentaerythritol tetraacrylate/commercially available polyvinyl chloride coating resin (Vinylite VYNW) was cast on grained aluminum from cyclohexanone to give a dry, polymerizable stratum coating weight of 0.031 g./100 cm.$^2$. Exposure to the electron beam through the stencil of 0.17 watt-sec./cm.$^2$ resulted in the formation of a relatively poor image; whereas, exposures of 0.42 and 0.85 watt-sec./cm.$^2$ resulted in good images. No heat intensification step was used. While satisfactory printed images were obtained, the plates showed relatively poorer wear resistance than those using other binders.

*Composition E*

An about 58/42 pentaerythritol tetraacrylate/commercially available polystyrene resin composition was laid down on grained aluminum from toluene to give a dry, polymerizable stratum coating weight of 0.015 g./100 cm.$^2$. Exposures to the electron beam through the stencil of 0.17 and 0.42 watt-sec./cm.$^2$ resulted in fair images; whereas, exposures of 0.85 watt-sec./cm.$^2$ formed a good image. No heat intensification step was carried out. The plates began to show significant wear after 3,000 copies.

*Composition F*

An about 58/42 pentraerythritol tetraacrylate/commercially available polyethylene oxide resin (Polyox WSR 205) was laid down from an 80/20 ethanol/water mixture containing a small amount (about 0.03%) of a commercially available wetting give a dry, polymerizable stratum coating weight of 0.009 g./100 cm.$^2$. Exposures through the stencil to the electron beam at 0.42 and 0.85 watt-sec./cm.$^2$ produced fair images.

*Composition G*

An about 58/42 pentaerythritol tetraacrylate/commercially available polyvinyl alcohol coating resin ("Elvanol"[2] 52–22 medium partially hydrolyzed) was laid down on grained aluminum from a 60/40 ethanol/water mixture to give a dry, polymerizable stratum coating weight of 0.022 g./100 cm.$^2$. Exposure through the stencil to the electron beam of 0.085, 0.17, 0.42, and 0.85 watt-sec./cm.$^2$ resulted in the formation of good images. The plates showed excellent printing behavior and 5,000 copies were easily obtained. The plate wear was comparable to that of the cellulose acetate/hydrogen succinate-based compositions of the other examples.

*Composition H*

An about 58/42 pentaerythritol tetraacrylate/commercially available ethylcellulose resin (Dow, "Ethocel"[3]) was laid down from an 80/20 ethanol/water mixture to give a dry, polymerizable stratum coating weight of 0.03 g./100 cm.$^2$. Exposures through the stencil to the electron beam of 0.017 to 0.085 watt-sec./cm.$^2$ resulted in the formation of negative images of the stencil.

[1] Du Pont's trademark for its nylon resin (soluble resin).
[2] Du Pont's trademark for polyvinyl alcohol resin.
[3] Dow Chemical Co. trademark for ethylcellulose resin.

EXAMPLE XXV

A mixture of 10 parts of a solution of a 28.2% by weight solution of a polyethylene 80/10/10 dimethylhexahydroterephthalate/sebacate/terephthalate in trichloroethylene, 2.85 parts of pentaerythritol tetraacrylate, and 115 parts of trichloroethylene was cast by a doctor knife with a 5-mil opening on a grained aluminum plate and the solvents allowed to evaporate, all as in Example XII. The dried polymerizable plate was exposed through an 80-mesh metal screen to a 50-kev. electron beam at exposures of 0.17 and 0.85 watt-sec./cm.$^2$. The exposed plates were developed by wiping with acetone, next with a mild abrasive, and finally with trichloroethylene. The exposed and developed plates were printed on a commercially available offset lithographic press (a Multilith 1250) as described in Example XI. Good image copies were obtained of the original mesh.

EXAMPLE XXVI

This illustrates the use of a self-supporting polymerizable layer in electron beam polymerization recording, i.e., where the transparent support of some of the other examples is not present and the polymerizable layer is its own support. To a 43-part portion of a filtered solution of 25 parts of cellulose acetate/hydrogen succinate, as described previously, in 180 parts of methyl ethyl ketone and 10 parts of water was added 2.6 parts of purified pentaerythritol tetraacrylate and the resultant solution cast on a glass plate using a doctor knife with a 15-mil opening. The solvents were allowed to evaporate from the cast film leaving a dry solid 66/34 cellulose acetate/hydrogen succinate pentaerythritol tetraacrylate film about one mil thick. The self-supporting polymerizable film was exposed to a 50 kev. electron beam, as before, through a 40-mesh screen for an exposure of 0.17 watt-sec./cm.$^2$. The thus exposed film was heated for five minutes at 136° C. On schlieren projection read-out of the thus exposed and developed film, there was obtained a good contrast image of the 40-mesh screen.

EXAMPLE XXVII

This example illustrates the effectiveness of extremely thin films of the polymerizable compositions. A 21.5-part portion of a solution of 25 parts of the previously described cellulose acetate/hydrogen succinate, 180 parts of methyl ethyl ketone, and 10 parts of water was mixed with 3.5 parts of pentaerythritol triacrylate. The resultant solution was filtered, and a 2-part portion thereof was diluted to 32 parts with methyl ethyl ketone. The dilute solution was cast on a grained aluminum base using a doctor knife with a 3-mil opening. The solvents were allowed to evaporate from the cast layer at room temperature, resulting in a cellulose acetate hydrogen succinate/pentaerythritol triacrylate layer on the grained aluminum substrate at a dry weight of 0.008 part/100 cm.$^2$ which corresponds to a polymerizable stratum approximately 0.3-micron thick. The polymerizable stratum was thin enough to show interference colors on visual inspection. Samples of the thin polymerizable film on the grained aluminum base were exposed to a 50 kev. electron beam through a perforated metal stencil for exposures of 0.17 and 0.40 watt-sec./cm.$^2$. The exposed films were heated for five minutes at 136° C. and the unexposed portions removed by wiping with suitable solvents. The exposed and developed plates were printed by standard offset lithography on a commercially available machine (a Multilith No. 1250) as described in detail in preceding Examples XI and XII. Both exposed and developed plates afforded good images of the modulating stencil. Similar results were obtained varying the dilution to one part of the polymerizable composed diluted to 48 parts with methyl ethyl ketone, thereby resulting in an 0.18–micron thick polymerizable stratum.

EXAMPLE XXVIII

This example illustrates the effectiveness of relatively thick polymerizable films in the electron beam read-in process of this invention. A 43-part portion of a solution of 25 parts of the previously described cellulose acetate/hydrogen succinate, 180 parts of methyl ethyl ketone, and 10 parts of water was mixed with 2.6 parts of pentaerythritol tetraacrylate, and the resultant solution was filtered twice through finely divided alumina. The resultant filtered solution was cast with a doctor knife at a 45-mil opening on a 4-mil thick commercially available polyethylene terephthalate photographic film base. The solvents were allowed to evaporate at room temperature, resulting in, on a dry basis, a 2.6–2.7-mil thick layer of an about 66/34 cellulose acetate hydrogen succinate/pentaerythritol tetraacrylate polymerizable stratum on the commercially available polyester film base. The polymerizable stratum on the film base was exposed to a 50-kev. electron beam through a metal screen with 100 micron openings for an exposure of 0.17 watt-sec./cm.$^2$. The exposed film was heated for five minutes at 136° C. On schlieren projection of the exposed heated film, there was obtained a good image with high contrast and good resolution of the modulating metal screen.

EXAMPLE XXIX

This example illustrates the use of dyed polymerizable films in the electron beam read-in and optical read-out variation of the process of this invention. A 12-gram portion of a solution consisting of 11 parts of cellulose acetate butyrate, 9 parts of cellulose acetate, 125 parts of acetone, and 57 parts of methyl ethyl ketone was mixed with 2.8 parts of pentaerythritol tetraacrylate, 4 parts of methanol, and 0.06 part of a commercially available black dye (Sevron Charcoal MF). The resultant solution was cast with a doctor knife at a 5-mil opening on a 4-mil thick commercially available polyethylene terephthalate photographic film base. The solvents were allowed to evaporate at room temperature, and the polymerizable layer on the film base support was exposed to a 50 kev. electron beam through a metal screen with 450-micron openings for an exposure of 0.17 watt-sec./cm.$^2$. The exposed film was heated at 136° C. for five minutes. Upon examination of the exposed heated film with a reflecting microscope using a polarizer and analyzer lens set both at 90°, a good contrast image with good resolution of the modulating screen was observed.

EXAMPLE XXX

To a 43-part solution of a filtered solution of 25 parts of the above-described cellulose acetate/hydrogen succinate in 180 parts of methyl ethyl ketone and 10 parts of water was added 2.6 parts of purified pentaerythritol tetraacrylate and the resultant solution was cast on a glass plate using a doctor knife with a 15-mil opening. The solvents were allowed to evaporate from the cast film at room temperature leaving a dry, solid 66/34 cellulose acetate hydrogen succinate/pentaerythritol tetraacrylate film about one mil thick. The self-supporting polymerizable film was exposed to a 50 kev. electron beam through a 40-mesh metal screen for an exposure of 0.017-watt-sec./cm.$^2$. The thus exposed film was heated for five minutes at 136° C. with the recorded surface in contact with a very fine grained, porous, cardboard surface. The unpolymerized, i.e., unexposed, areas were surface opacified where in intimate contact with the porous surface during the heating or development step. There was thus obtained a positive image of the modulating screen which showed up in fair contrast on optical projection in a conventional projector.

The instant invention is not limited to the use of the particular polymerizable compositions of the examples. Suitable compositions which can also be used without their photoinitiators are described in Plambeck, U.S. Patents 2,760,863 and 2,791,504. Other polymerizable compositions and organic binders which can be used preferably without their photoinitiators are described in the patents of assignee as follows:

(1) the N-methoxymethyl hexamethylene adipamide/polymerizable component of Saner British specification No. 826,272.

(2) the linear polyamide containing extralinear n-acrylyloxymethyl group/polymerizable component mixtures of Saner et al. U.S. Patent 2,972,540;

(3) the compositions based on polyvinyl acetals with extralinear vinylidene groups of Martin U.S. Patent 2,929,710;

(4) the polyester, polyacetal, or mixed polyester acetal/polymerizable component mixtures of Martin U.S. Patent 2,892,716;

(5) the blends of selected organic-soluble, base-soluble cellulose derivatives with addition polymerizable components and photoinitiators of Martin et at. U.S. Patent 2,927,022;

(6) the aqueous base-soluble polyvinyl alcohol ester, ether, and/or acetal/polymerizable component mixtures of Martin U.S. Patent 2,902,365;

(7) the basic monomer/acidic polymer or acidic monomer/basic polymer compositions of U.S. 2,893,868;

(8) the polyether-urethane/polymerizable monomer compositions of U.S. Patent 2,948,611;

(9) the selected organic-soluble, base-soluble, cellulose derivative/polymerizable monomer compositions of Martin et al. U.S. Patent 2,927,022;

(10) the water-soluble cellulose derivative/polymerizable monomer compositions of U.S. Patent 2,927,023;

(11) the solid polymerizable chelate compositions of U.S. Patent 3,016,297;

(12) the improved polymerizable compositions containing a three-component polymer mixture comprising a cellulosic polymer capable of yielding non-brittle printing elements of Notley U.S. Patent 3,036,915, May 29, 1962; and

(13) the improved polymerizable compositions capable of yielding non-brittle printing elements comprising high molecular weight polyethylene oxide of Jennings U.S. Patent 3,036,914, May 29, 1962.

In many of the foregoing examples, heat treatment following electron beam exposure was applied. For reasons of convenience, this was arbitrarily selected as a five-minute heat treatment at 136° C. Such arbitrarily selected conditions are not necessarily limiting, nor is any heat absolutely necessary. Thus, at the lower limits of electron beam exposure, some such heat treatment is usually needed to give an image with sufficiently high contrast. This will generally be in the 50–150° C. range, depending on the melting point of the polymer, for times usually in the up to 5-min. range. However, at the higher electron beam exposure levels (see, for instance, Example VII), the heat treatment is not needed at all and the exposed record gives a satisfactorily sensible contrast image.

The fundamental principles of the schlieren optical systems used in obtaining the projection copies of the electron beam read-in patterns by the technique of this invention are well known in the art and are described in some detail, for instance, by Longworth, Ind. Eng. Chem. Annal Ed. 18, 219 (1946). Schlieren optical systems are available from 47 manufacturers and/or suppliers as listed at page 96 of the Optical Industry Directory, 1961, the Optical Publishing Company, Lennox, Massachusetts.

The new process of information storage and retrieval of the present invention is useful for high-density facsimile recording systems, as well as for high-speed data recording and display. The systems are also useful in general analog or digital recording. In the latter, for instance, read-in means might be operated on a recording member in a single track or groove with transverse modulation or sweeping, with the read-out from the recorded member thereby obtained by handling with a flying spot scanner.

One difference from the prior art discussion of electron beam-initiated polymerization of ethylenically unsaturated, addition polymerizable compositions in the present information recording and retrieval system is the fact that electron beam read-in is fully feasible with relatively low energy electrons. Most previously reported such work, e.g., radiation grafting and the like, used high energy beams in the 1,000,000 to 3,000,000 ev. range or higher. The present process uses electron beams of from 5 to no more than 100,000 ev. and preferably from 1000 to 50,000 ev., i.e., 1–50 kev.

A surprising factor in these systems is that the amount of polymerization effected in image areas depends only on the total number of electrons per unit area over a wide range covering a variation of seven orders of magnitude of exposure times. Such reciprocity is not only surprising but allows high-speed recording at moderate beam intensities as well as greatly facilitating control of the read-in beam obtained by intensity modulation thereof thereby permitting high resolution.

While in the foregoing broad and detailed description of the new process of the present invention, the read-in means has always been referred to as electron beam read-in means, other modulatable read-in means, capable of controllably effecting addition polymerization of ethylenically unsaturated, addition polymerizable monomers, can also be used. Thus, for instance, imagewise exposure to actinic light could also serve; however, in the use of such it has been found necessary for polymerization that the polymerizable stratum of the recording member must contain a significant amount of an addition polymerization initiator activatable by the said actinic light. The necessary presence of this initiator makes such recording members and the process wherein they are used undesirable in view of the necessity of protecting the recording member from any exposure to actinic light before the actual recording is effected. In contrast thereto, the electron beam read-in means, which forms the heart of the present invention, requires only the presence of, firstly, a suitable binder, preferably polymeric so as to render the over-all recording member solid; secondly, if desired, a suitable transparent support; and, thirdly, an ethylenically unsaturated, addition polymerizable component which can be imagewise polymerized by the electron beam read-in means. As indicated in the examples trace amounts of initiators can be present but they are not needed.

The present invention has the advantage that it provides new, simple and practical processes for the recording of information, imagewise. Another advantage is that it provides a novel and important process for the storage and retrieval of information that is accurate and involves a simple chemical reaction and physical change in polymerizable layers. A further advantage of the processes of the invention is that images of high packing density can be obtained readily. A still further advantage is that extremely thin polymerizable layers can be used and good resolution can be attained. A still further advantage of the invention resides in the fact that the processes have wide versatility in the read-out techniques for retrieving information. Still further advantages will be apparent from the foregoing description of the invention.

I claim:

1. A process which comprises (1) recording information by patternwise-exposing to an electron beam an image-recording polymerizable layer comprising at least one non-gaseous ethylenically unsaturated compound having a boiling point above 100° C. at normal pressure and being capable of forming a polymer of high molecular weight by addition polymerization, to form an image, patternwise, comprising a crosslinked addition polymer in the patternwise exposed areas of said member and (2) retrieving said information physically from the exposed and polymerized image areas and remaining unexposed background areas of said exposed member.

2. A process according to claim 1 wherein said layer is a solid and polymerizable stratum 0.1 micron to 3.0 mils in thickness containing 10 to 60 parts by weight of the ethylenically unsaturated compound and 40 to 90 parts, by weight, of a polymer binding agent.

3. A process according to claim 1 wherein the information retrieval is effected optically.

4. A process according to claim 1 wherein the information retrieval is effected mechanically.

5. A process according to claim 1 wherein the information retrieval is effected electronically.

6. A process according to claim 1 wherein the information retrieval is effected optically by schlieren projection.

7. A process according to claim 1 wherein the information retrieval is effected optically by schlieren projection using the refractivity gradient at the boundary between the polymerized image areas and the unpolymerized areas.

8. A process according to claim 1 wherein the information retrieval is effected optically by shadow optics techniques.

9. A process according to claim 1 wherein the information retrieval is effected optically by internal light scattering.

10. A process according to claim 1 wherein the information retrieval is effected optically by surface light scattering.

11. A process according to claim 1 wherein the information retrieval is effected mechanically by removing the unexposed, unpolymerized, areas and printing from the exposed, polymerized image areas by lithographic techniques.

12. A process according to claim 1 wherein the information retrieval is effected electronically by scanning the recorded layer over a conducting backing with a low energy electron beam and reading the resulting anode current which varies in magnitude between exposed, polymerized areas and non-exposed areas.

13. A process according to claim 1 wherein the information retrieval is effected electronically by electrically charging the recording surface and dusting with an electrostatic toner powder which adheres selectively to the exposed, polymerized areas.

14. A process according to claim 1 wherein the step of exposing the layer is at 0.005 to 100 kev. for $1\times10^{-4}$ watt sec./cm.$^2$ to 0.55 watt sec./cm.$^2$.

15. A process according to claim 1 wherein the retrieving of said information from the patternwise exposed polymerizable member is by optical means in accordance with the gradient difference in physical properties between the exposed, polymerized areas and the unexposed, unpolymerized areas of the recorded member.

16. A process according to claim 15 wherein said polymerizable layer contains a free radical-generating addition polymerization initiator.

References Cited by the Examiner

UNITED STATES PATENTS

| | | | |
|---|---|---|---|
| 2,985,866 | 5/1961 | Norton | 178—6.6 |
| 3,040,124 | 6/1962 | Camras | 178—6.6 |
| 3,063,872 | 11/1962 | Goldebuck | 178—6.6 |
| 3,099,558 | 7/1963 | Levinos | 178—6.6 |
| 3,113,179 | 12/1963 | Glenn | 178—6.6 |

DAVID G. REDINBAUGH, *Primary Examiner.*

H. W. BRITTON, *Assistant Examiner.*